United States Patent
Collins et al.

(10) Patent No.: US 6,424,828 B1
(45) Date of Patent: Jul. 23, 2002

(54) INTERNET SERVER AND METHOD FOR PROVIDING ACCESS TO INTERNET E-MAIL AND INTERNET WEB PAGES

(75) Inventors: William H. Collins, Raleigh, NC (US); Aaron D. Cubbage, Fleet (GB); Inderpreet S. Ahluwalia, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/325,326

(22) Filed: Jun. 3, 1999

(51) Int. Cl.[7] .............................................. H04M 11/10
(52) U.S. Cl. ...................... 455/412; 455/466; 455/445; 709/227; 709/204; 709/206; 379/93.25; 379/9.01
(58) Field of Search ................................ 455/412, 466, 455/445; 709/227, 204, 206; 379/90.01, 93.25

(56) References Cited

U.S. PATENT DOCUMENTS

| | | | | |
|---|---|---|---|---|
| 5,966,663 | A | * 10/1999 | Gleason ....................... | 455/466 |
| 6,026,441 | A | * 2/2000 | Ronen ......................... | 709/227 |
| 6,138,158 | A | * 10/2000 | Boyle et al. ................. | 709/225 |
| 6,169,897 | B1 | * 1/2001 | Kariya ......................... | 455/426 |
| 6,178,331 | B1 | * 1/2001 | Homes et al. .............. | 455/466 |
| 6,332,020 | B1 | * 12/2001 | Michell et al. ........... | 379/93.25 |
| 6,335,928 | B1 | * 1/2002 | Herrmann .................... | 370/352 |
| 6,338,085 | B1 | * 2/2002 | Ramaswamy ................. | 709/217 |

\* cited by examiner

Primary Examiner—William Trost
Assistant Examiner—Danh Le

(74) Attorney, Agent, or Firm—Gregory A. Stephens, P.C.

(57) ABSTRACT

An Internet server allows a cellular telephone to acquire a short messaging service (SMS) address for an Internet station. A user of the cellular telephone generates a preliminary message including an Internet e-mail address for the Internet station. The preliminary message is sent to the Internet server using the SMS. The Internet server generates a reply message having the Internet station e-mail address in a sender address field. The reply message, when sent to the cellular telephone, prompts the Internet gateway to supply the SMS address for the Internet station to the cellular telephone. Further, the Internet server processes an initial message from the cellular telephone to at least one Internet station. The initial message includes a communication for an Internet station, a first line of the communication including the Internet e-mail address for the Internet station. The server generates a message having the Internet e-mail address of the Internet station in a recipient address field, and including the communication, and sends the message to the Internet station. The Internet server additionally processes an e-mail message from an Internet station to the cellular telephone, where the e-mail message includes a communication greater than a maximum communication length imposed by the SMS. The server divides the communication into a plurality of portions less than the maximum communication length. The server generates a plurality of messages, where each message includes one of the portions of the communication. The messages are sent by the server to the cellular telephone. Further, the Internet server provides the cellular telephone access to an Internet web page. The cellular telephone generates a request message including an Internet web page address, and sends the request message to the server. The server accesses the Internet web page and generates a message to the cellular telephone, the message including a content of the Internet web page.

16 Claims, 10 Drawing Sheets

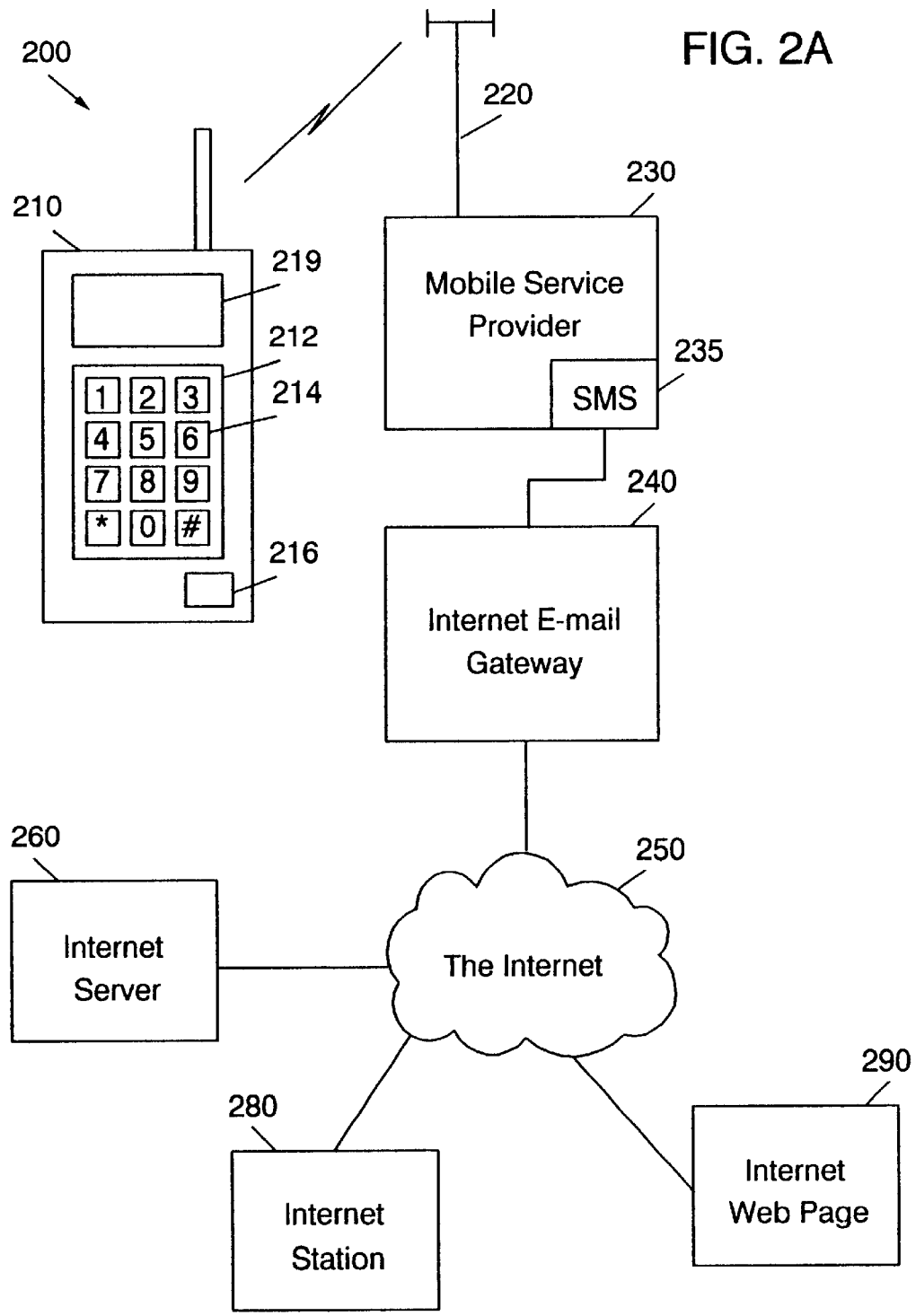

INTERNET SERVER AND METHOD FOR PROVIDING ACCESS TO INTERNET E-MAIL AND INTERNET WEB PAGES

FIELD OF THE INVENTION

The present invention is directed to an Internet server and method providing a cellular telephone improved access to Internet e-mail and to Internet web pages.

BACKGROUND OF THE INVENTION

With the growing wealth of information available on the Internet, and the convenience of Internet e-mail, mobility of Internet access is desired.

One mobile means for gaining Internet access is to use a laptop personal computer (PC) in conjunction with a cellular telephone to contact an Internet service provider (ISP). This provides access to Internet web pages and Internet e-mail, but at the expense of a laptop PC and an ISP subscription. Further, laptop PCs can be difficult and inconvenient to carry.

A second mobile means for gaining Internet access is to use the Nokia 9000 cellular telephone, which is a palmtop PC and a cellular telephone built into one package. However, the Nokia 9000 cellular telephone, with its large display and keyboard, is more expensive than a standard cellular telephone, is inconvenient to carry, and also requires an ISP subscription.

Another way for gaining mobile Internet access is to use an e-mail utility of a short message service (SMS) for a cellular communications system. Such mobile access requires only a cellular telephone and a subscription to the e-mail utility (which is less than for an ISP subscription), but is limited to sending and receiving Internet messages only.

The SMS of a cellular communications system provides a user of a cellular telephone the capability for sending a written message (SMS message) to another cellular telephone, the written message consisting of alphanumeric characters entered using the cellular telephone keypad. Further, the SMS allows a cellular telephone to reply to a received SMS message. The e-mail utility of the SMS allows the cellular telephone to send messages to and receive messages from an Internet station.

To send the SMS message from a cellular telephone to the Internet station, the user of the cellular telephone creates the SMS message, placing an SMS address for the Internet station in a recipient address field of the SMS message. The cellular telephone sends the SMS message, which is received by the SMS. The SMS forwards the SMS message to an Internet e-mail gateway, which provides a link between the SMS and the Internet. The Internet e-mail gateway converts the SMS message to an Internet e-mail message, and forwards the Internet e-mail message to the Internet station using the Internet. However, where the SMS address for the Internet station is not available to the user of the cellular telephone, the user must contact the Internet station and request that the Internet station send a message to the cellular telephone. In this case, the message from the Internet station is received at the Internet e-mail gateway and converted to an SMS message, at which time the SMS address for the Internet station is created. The SMS message is forwarded to the cellular telephone. The user of the cellular telephone may then reply to the forwarded SMS message.

Additionally, because the SMS limits SMS messages to 160 characters, messages greater than 160 characters sent to the cellular telephone using the SMS e-mail utility are truncated by the Internet e-mail gateway, thereby disposing of potentially important information for the cellular telephone user.

Further, where the user of the cellular telephone desires to send a communication to more than one Internet station, SMS messages must be created containing the communication for each Internet station, a time consuming activity.

The present invention is directed to overcoming one or more of the problems discussed above in a novel and simple manner.

SUMMARY OF THE INVENTION

An Internet server and method acquire a messaging service address of an Internet station for a user of a cellular telephone. Thus, written messages may be sent to the Internet station without first having to contact the Internet station. Additionally, an Internet server and method are provided for processing and forwarding an initial message from a cellular telephone to an Internet station, the initial message including a communication and an e-mail address for the Internet station. Thus, written messages including the communication may be sent to the Internet station via the Internet server. Further, an Internet server and method are provided for processing and delivering a message from an Internet station to a cellular telephone where the message is greater than a maximum allowable message length for the e-mail utility. In this way, the cellular telephone may receive messages greater than the maximum limit imposed by a short messaging service of the communications system. Additionally, an Internet server and method provide the user of a cellular telephone access to an Internet web page.

More specifically, an Internet server and method of acquiring for a cellular telephone a messaging service address for an Internet station using the server and a cellular communications system including the cellular telephone and a messaging service e-mail utility, where the messaging service address for the Internet station is not available, includes generating a preliminary message at the cellular telephone. The preliminary message includes a messaging service address of the server in a recipient address field and an e-mail address of the Internet station. The preliminary message is sent to the server using a mobile service provider, an Internet e-mail gateway, and the Internet. The e-mail address of the Internet station is extracted from the preliminary message at the server using an address extractor. An e-mail generator generates a reply message to the cellular telephone, where the reply message includes the e-mail address of the Internet station in a sender address field. The e-mail dispatcher sends the reply message from the server to the cellular telephone.

An Internet server and method are provided for processing a message from a cellular telephone to an Internet station using the server and a cellular communications system including a cellular telephone and a messaging service e-mail utility, where the initial message is generated at the cellular telephone, the initial message including an Internet server address of the server in a recipient address field, an e-mail address of the Internet station and a communication. The initial message is received from the cellular telephone at the server. The e-mail address of the Internet station is extracted from the initial message at the server using an address extractor. A message extractor extracts the communication from the initial message at the server, and a message is generated by an e-mail generator at the server, the message including the e-mail address of the Internet station in the recipient address field, and a communication. The message is sent by an e-mail dispatcher to the Internet station.

An Internet server and method for processing and delivering a message from an Internet station to a cellular telephone using the server and a communication system including the cellular telephone and a messaging service e-mail utility where the message is greater than a maximum allowable message length for the e-mail utility includes receiving the message from the Internet station at the server. The message includes a server e-mail address of the cellular telephone in a recipient address field and a communication. The server e-mail address of the cellular telephone is extracted by an address extractor at the server. A message extractor extracts the communication from the message. An e-mail divider divides the communication into a plurality of portions at the server, each portion being less than the maximum allowable message length. An e-mail generator determines an e-mail address for the cellular telephone, and generates a plurality of messages, each message including the e-mail address of the cellular telephone in the recipient address field and one of the portions of the communication. The messages are sent by an e-mail dispatcher to the cellular telephone.

An Internet server and method of accessing an Internet web page having an Internet web page address from a cellular telephone using the server and a communication system including the cellular telephone and a messaging service e-mail utility includes generating a request message at the cellular telephone. The request message includes a messaging service address of the server in a recipient address field and the Internet web page address. The request message is sent to the server, and an address extractor extracts the Internet web page address from the request message at the server. The Internet web page is accessed at the server using an Internet accessor. A content of the Internet web page is received at the server, and an e-mail address of the cellular telephone is determined. An e-mail generator generates a message, the message including the e-mail address of the cellular telephone in the recipient address field and the content of the Internet web page. The message is sent by the e-mail dispatcher to the cellular telephone.

In one aspect, the content of the Internet web page is greater than a maximum allowable message length for the e-mail utility, and a divider divides the content into a plurality of portions less than a maximum allowable message length. The e-mail generator generates a plurality of messages, each message including one of the portions of the content and including the e-mail address of the cellular telephone in the recipient address field. The plurality of messages are sent by the e-mail dispatcher to the cellular telephone.

BRIEF DESCRIPTION OF THE DRAWINGS

FIG. 2A is a block diagram of a cellular communications system including an Internet server;

FIG. 10 is a block diagram of the Internet server for providing Internet web page access to a cellular telephone.

DETAILED DESCRIPTION OF THE INVENTION

Before discussing the Internet servers and methods, it is helpful to understand the formats of an SMS message and an Internet e-mail message, and the process for sending and receiving such messages using a Global System for Mobile Communications (GSM).

Figure 1A:
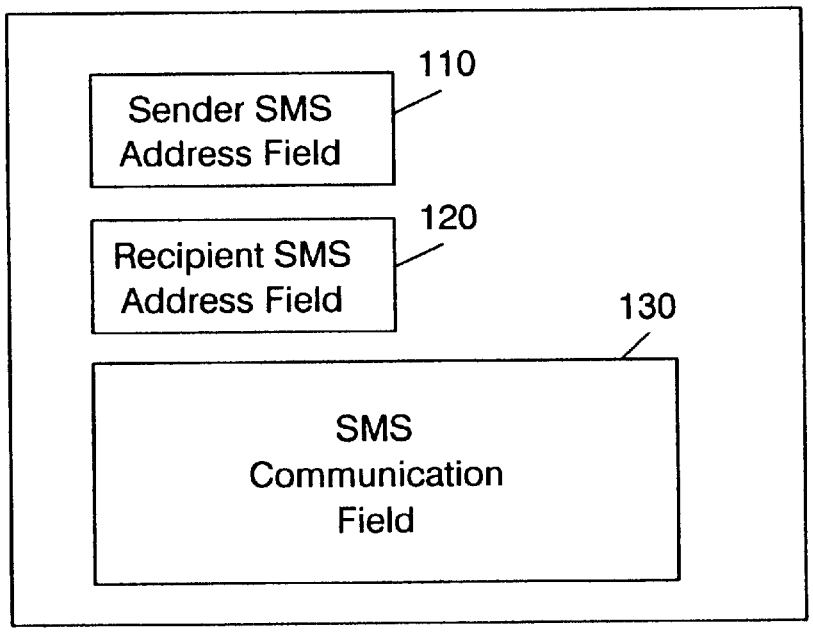
FIGS. 1A and 1B are illustrations of the message formats for an SMS message and an Internet e-mail message, respectively.

Format 100 for an SMS message is shown in FIG. 1A. The SMS message 100 includes a sender SMS address field 110, a recipient SMS address field 120 and a communication in an SMS communication field 130. The communication is limited to 160 characters, which occupy 140 bytes.

Figure 1B:
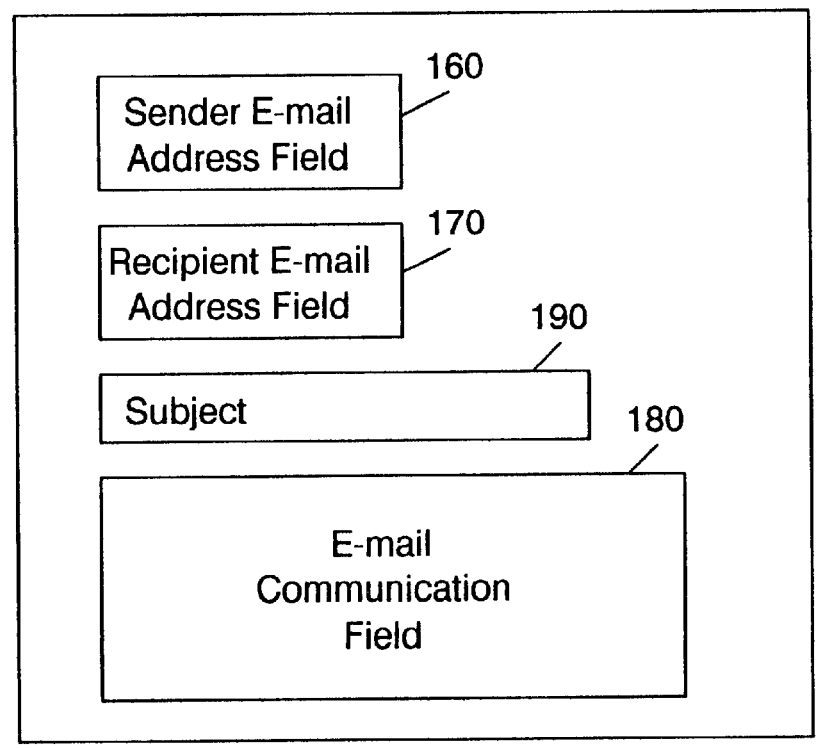

A format 150 for an Internet e-mail message is shown in FIG. 1B. The Internet e-mail message 150 includes a sender e-mail address field 160, a recipient e-mail address field 170, and a communication in an e-mail communication field 180. The communication for the Internet e-mail message is not limited to 160 characters. The Internet e-mail message 150 further includes a subject field 190 for a brief summary of the communication.

A block diagram of a cellular communications system is shown in FIG. 2. Cellular communications system 200 includes a cellular telephone 210 in communication with a mobile service provider 230 using an antenna 220, where the cellular telephone 210 is capable of sending and receiving SMS messages. Although not shown, the antenna 220 is coupled to a base station, which relays received cellular telephone information to a telecommunications switch supported by a mobile service provider, for example, the mobile service provider 230, as is well known. The mobile service provider 230 may be any provider of service for cellular stations, for example, BellSouth. The mobile service provider 230 includes a short messaging service (SMS) 235. The SMS 235 is coupled to an Internet e-mail gateway 240. The Internet e-mail gateway 240 provides the link between the SMS 235 and the Internet 250. The Internet 250 is shown in communication with an Internet station 280.

An SMS message in the form of the SMS message 100 is generated by a user of the cellular telephone 210 using a keypad 212. The user enters a messaging system address (SMS address) for the Internet station 280 or another cellular telephone (not shown) in the recipient SMS address field 120 of the SMS message 100 using the keypad 212. The SMS address of the cellular telephone 210 is automatically placed in the sender SMS address field 110 of the SMS message. The user creates a communication using the keypad 212 on the cellular telephone 210, where the communication is placed in the SMS communication field 130. The user sends the SMS message by pressing a "send" key 216 on the cellular telephone 210.

Figure 2B:
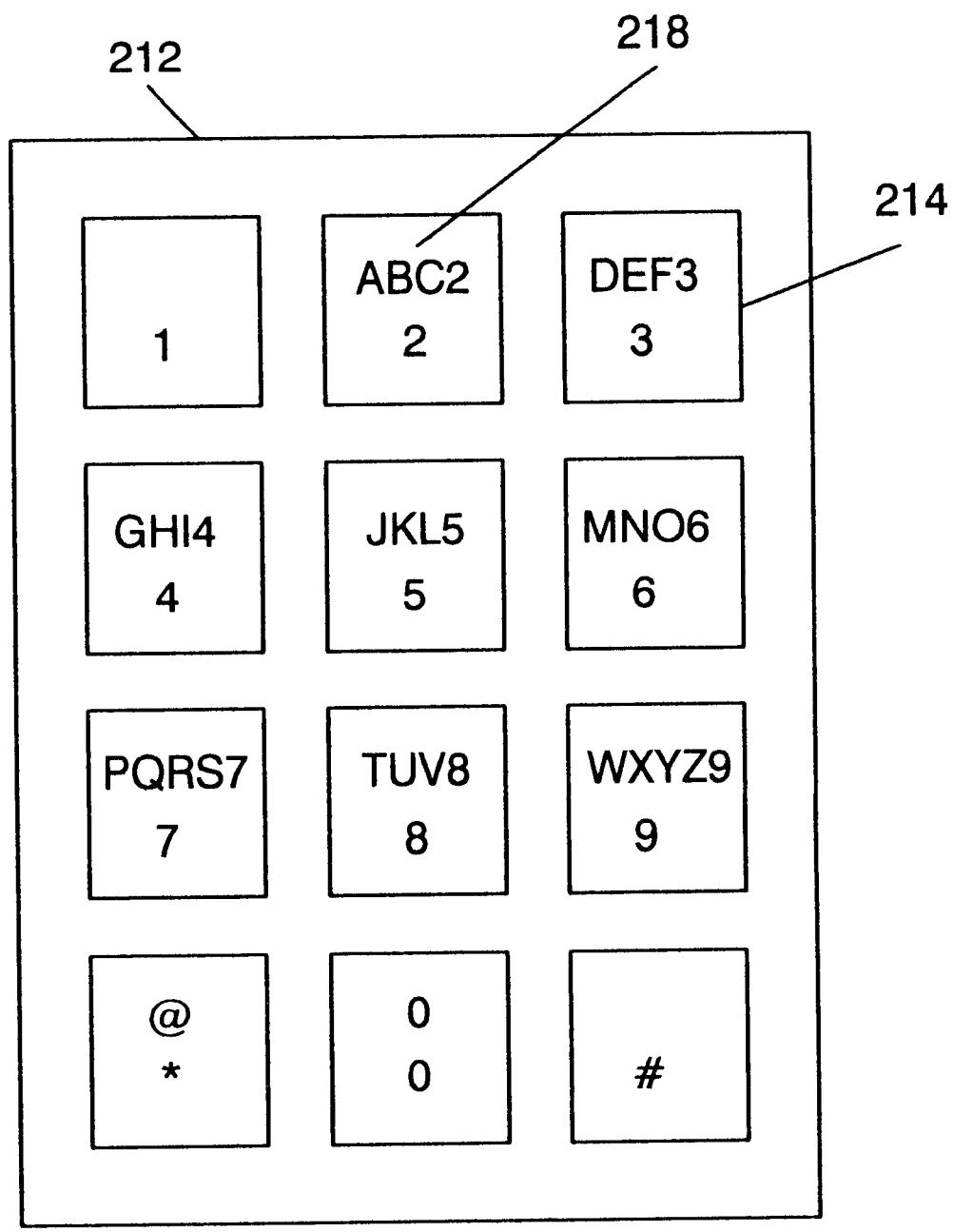
FIG. 2B is a detailed illustration of a cellular telephone keypad.

To understand how the user enters the SMS address and the communication, a more detailed description of the cellular telephone keypad 212 is provided in FIG. 2B. Each row of the keypad 212 contains three buttons, each button designated by a character. For example, the row 214 includes the buttons designated by the numerals "1", "2" and "3". The buttons represented by the keys on the keypad 212 may further include a character grouping such as a character grouping 218 on the button "2". The character grouping 218 includes "A", "B", "C" and "2". To enter a character in the SMS message, the user locates the button having the desired character to be entered in the SMS message. The button is then quickly pressed a number of times corresponding to the position of the desired character in the respective character grouping. For example, to enter a "B" in the SMS message, the user locates the button having a "B", in this case the button designated by the numeral "2". Since the "B" is the second letter in the character grouping 218, the user presses the "2" button twice in a rapid fashion to choose the "B". The character is entered in the message after a brief pause, or after a different button is selected for entering further desired characters. Special characters, such as the "@" are entered in a similar fashion.

The SMS message is received by the SMS 235 of the mobile service provider 230. A suitable processor in the SMS 235 determines whether the SMS address in the recipient SMS address field 120 of the SMS message is a standard SMS address, or an Internet e-mail address. For example, in a BellSouth SMS, if the SMS address begins with a "9999," the processor determines that the SMS message is for an Internet station, and not another cellular telephone. Where the SMS message is for another cellular telephone, the SMS 235 transmits the SMS message to the other cellular telephone using the mobile service provider 230. However, if the SMS message is for an Internet station, for example, the Internet station 280, the SMS message is forwarded to the Internet e-mail gateway 240.

The Internet e-mail gateway 240 converts the SMS message 100 to an Internet e-mail message having the format 150. To accomplish this, the Internet e-mail gateway 240 determines an Internet e-mail address for the cellular telephone 210 and for the Internet station 280. Regarding the Internet e-mail address for the cellular telephone 210, the Internet e-mail gateway 240 adds the domain name for the Internet e-mail gateway 240 to the SMS address for the cellular telephone located in the sender SMS address field 110 of the SMS message. To determine the Internet e-mail address for the Internet station 280, the Internet e-mail gateway 240 uses a messaging service lookup table having a first column with a list of SMS addresses, where each SMS address corresponds to an Internet e-mail address in a second column of the lookup table. The Internet e-mail gateway 240 locates the SMS address of the Internet station 280 in the first column of the lookup table. The Internet e-mail address for the Internet station 280 is retrieved from the second column of the lookup table at a location corresponding to the Internet station SMS address of the first column. The Internet e-mail gateway 240 replaces the SMS address for the cellular telephone with the Internet e-mail address for the cellular telephone, and replaces the SMS address for the Internet station 280 with the Internet e-mail address for the Internet station 280, thereby converting the sender SMS address field 1 10 and the recipient SMS address field 120 in the sender e-mail address field 160 and the recipient e-mail address field 170, respectively. The Internet e-mail gateway 240 generates the subject field, which is left empty. Nothing need be done to the communication in the SMS communication field 130 to convert the SMS communication field to the e-mail communication field 180. Thus, the SMS message is converted to the Internet e-mail message. The Internet e-mail gateway 240 forwards the Internet e-mail message to the Internet 250, which delivers the message to the Internet station 280.

To send an message from the Internet station 280 to the cellular telephone 210, a message is generated at the Internet station 280, where the e-mail address of the cellular telephone 210 is placed in the recipient e-mail address field 170 of the message. The Internet station 280 forwards the message to the Internet 250, which sends the message to the Internet e-mail gateway 240.

The Internet e-mail gateway 240 converts the message to an SMS message. To accomplish this, the Internet e-mail gateway 240 removes the domain name from the Internet e-mail address of the cellular station in the recipient e-mail address field 170, thereby converting the field to a recipient SMS address field 120. The Internet e-mail gateway 240 locates the e-mail address of the Internet station in the second column of the messaging service lookup table, and places the corresponding SMS address from the first column of the lookup table in the sender address field, thereby converting the sender e-mail address field 160 to the sender SMS address field 110. However, if the e-mail address for the Internet station is not located in the second column of the lookup table, the Internet e-mail gateway 240 adds the e-mail address for the Internet station to the second column of the lookup table and generates an SMS address for the Internet station, which is placed in the first column of the lookup table corresponding to the e-mail address of the Internet station. In an Internet e-mail gateway for a BellSouth mobile service provider, the generated SMS address begins with "9999" indicating that the SMS address corresponds to an Internet e-mail address and not to a cellular telephone. The generated SMS address is placed in the sender address field, thereby converting the sender e-mail address field 160 to a sender SMS address field 110. The subject field is placed in a first line of the communication in the e-mail communication field 180, thereby converting the e-mail communication field 180 to an SMS communication field 130. In this way, the Internet e-mail gateway 240 converts the message to an SMS message. An alternate way of converting the recipient e-mail address field 170 to the recipient SMS address field 120 uses a lookup table in a similar fashion as for converting the sender e-mail address field 160 to the sender SMS address field 110. The Internet e-mail address of the cellular station in the recipient e-mail address field is located in a first column of the lookup table, and a corresponding SMS address is read from a second column and placed in the recipient SMS address field 120.

The SMS message is forwarded to the SMS 235 of the mobile service provider 230, and the mobile service provider 230 delivers the SMS message to the cellular telephone 210.

Figure 11:
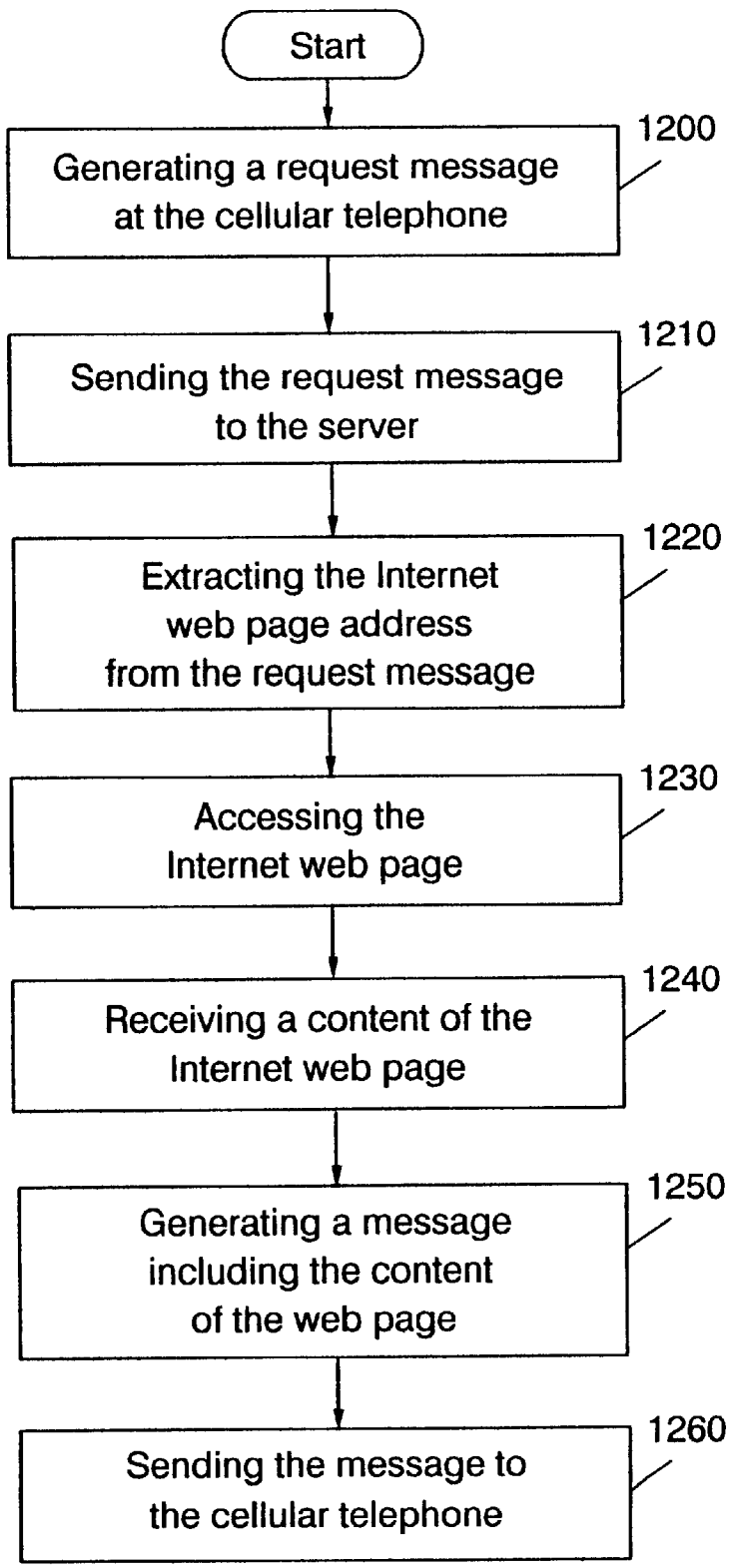
FIG. 11 is a flow chart illustrating operation of the Internet server of FIG. 10.

The cellular communications system 200 further includes an Internet server 260, and an Internet web page 290. The Internet server 260 allows the cellular telephone 210 to acquire an SMS address for the Internet station 280 (FIGS. 3–4), or to send a communication to at least one Internet station 280 (FIGS. 5–7), to receive a message greater than a maximum SMS message length from the Internet station 280 (FIGS. 8–9), and to access the Internet web page 290 (FIGS. 10–11).

Figure 3:
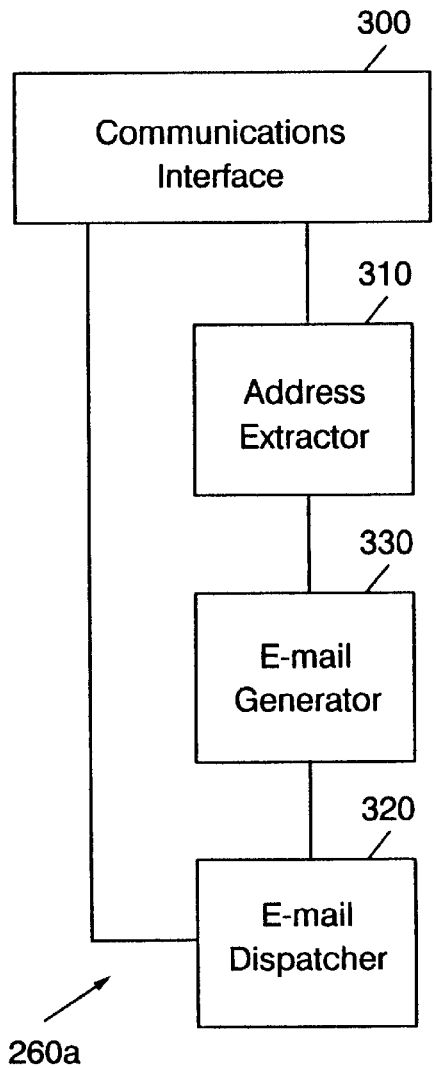
FIG. 3 is a block diagram of the Internet server for acquiring a messaging service address of an Internet station.
Figure 4:
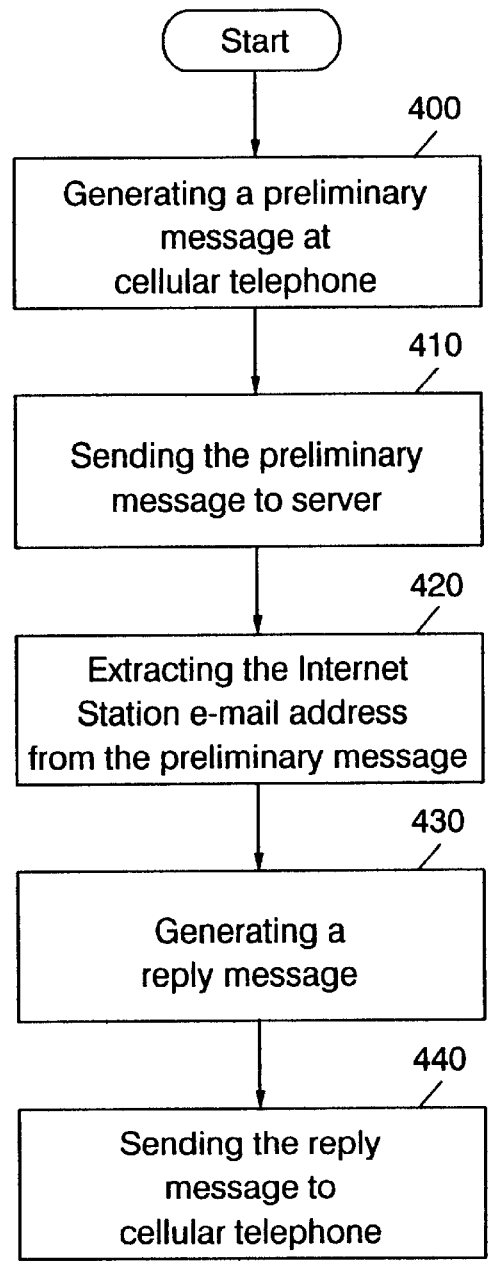
FIG. 4 is a flow chart illustrating operation of the cellular communications system having the Internet server of FIG. 3.

An Internet server 260a for allowing the cellular telephone 210 to acquire an SMS address for the Internet station 280 is shown in FIG. 3. A communications interface 300 provides the link between the server and the Internet 250 and is for receiving and sending information, for example messages, to and from the server 260a. The communications interface 300 is coupled to an address extractor 310 and an e-mail dispatcher 320. The address extractor 310 extracts an e-mail address from an Internet e-mail message. The e-mail dispatcher 320 dispatches messages from the Internet server 260a using the communications interface 300. The address extractor 310 and the e-mail dispatcher 320 are coupled to an e-mail generator 330 which generates messages. Operation of the server 260a in conjunction with the cellular communications system 200 is described with reference to the flow chart of FIG. 4.

A preliminary message in the form of the SMS message 100 is generated by a user of the cellular telephone 210, at block 400. The user places an e-mail address for the Internet station 280 in the SMS communication field 130 of the preliminary SMS message. The Internet station 280 is one which has never sent e-mail to a cellular telephone using a messaging service e-mail utility such as the SMS e-mail utility, or one for which an SMS address is not available. The SMS address of the Internet server 260a is placed in the recipient SMS address field 120 of the preliminary SMS message, and the SMS address of the cellular telephone is automatically placed in the sender SMS address field 110 of the preliminary message. In block 410, the preliminary message is sent to the server 260a, as described above in reference to FIG. 2, where the Internet e-mail gateway 240 converts the preliminary SMS message is to a preliminary e-mail message.

The communications interface 300 receives the preliminary e-mail message and the address extractor 310 extracts the e-mail address of the cellular telephone 210 from the sender e-mail address field 160. The e-mail address of the Internet station is extracted from the communication of the preliminary e-mail message, as shown in block 420. The e-mail addresses of the cellular telephone and the Internet station are passed to the e-mail generator 330, which generates a reply e-mail message to the cellular telephone 210 in the form of an message like Internet e-mail message 150, block 430. To do this, the e-mail generator 330 places the e-mail address of the cellular telephone 210 in the recipient e-mail address field 170 of the reply e-mail message, and places the e-mail address of the Internet station in the sender e-mail address field 160. The e-mail generator 330 places the text "SMS address for" followed by the e-mail address of the Internet station in the e-mail communication field 180 of the reply e-mail message. In block 440, the Internet server 260a sends the reply e-mail message to the cellular telephone 210.

To send the reply e-mail message, the e-mail generator 330 passes the reply e-mail message to the e-mail dispatcher 320, which sends the reply e-mail message using the communications interface 300 and the Internet 250. The Internet e-mail gateway 240 receives the reply e-mail message, generates the SMS address for the Internet station and converts the reply e-mail message to a reply SMS message, as discussed above in reference to FIG. 2. The reply SMS message is delivered to the cellular station 210.

The user of cellular telephone 210 may then generate a reply to the reply SMS message, or record the SMS address for the Internet station 280 for later use.

The SMS address for the Internet server 260a is created at the time the Internet server 260a is brought on-line. At that time, the Internet server 260a may send an e-mail to the cellular telephone 210. When this occurs, the Internet e-mail gateway 240 assigns an SMS address for the Internet server 260a. This SMS address may be communicated by the Internet server 260a sending each cellular telephone a message, or by the SMS of the mobile service provider sending a system message to all SMS subscribers, the system message including the SMS address for the Internet server 260a.

The Internet server 260a thus allows a user of a cellular telephone to acquire an SMS address for the Internet station without contacting the Internet station, for example, in situations where the Internet station has never sent a message to a cellular telephone, or where the user of the cellular telephone has misplaced the SMS address for the Internet station.

Figure 5:
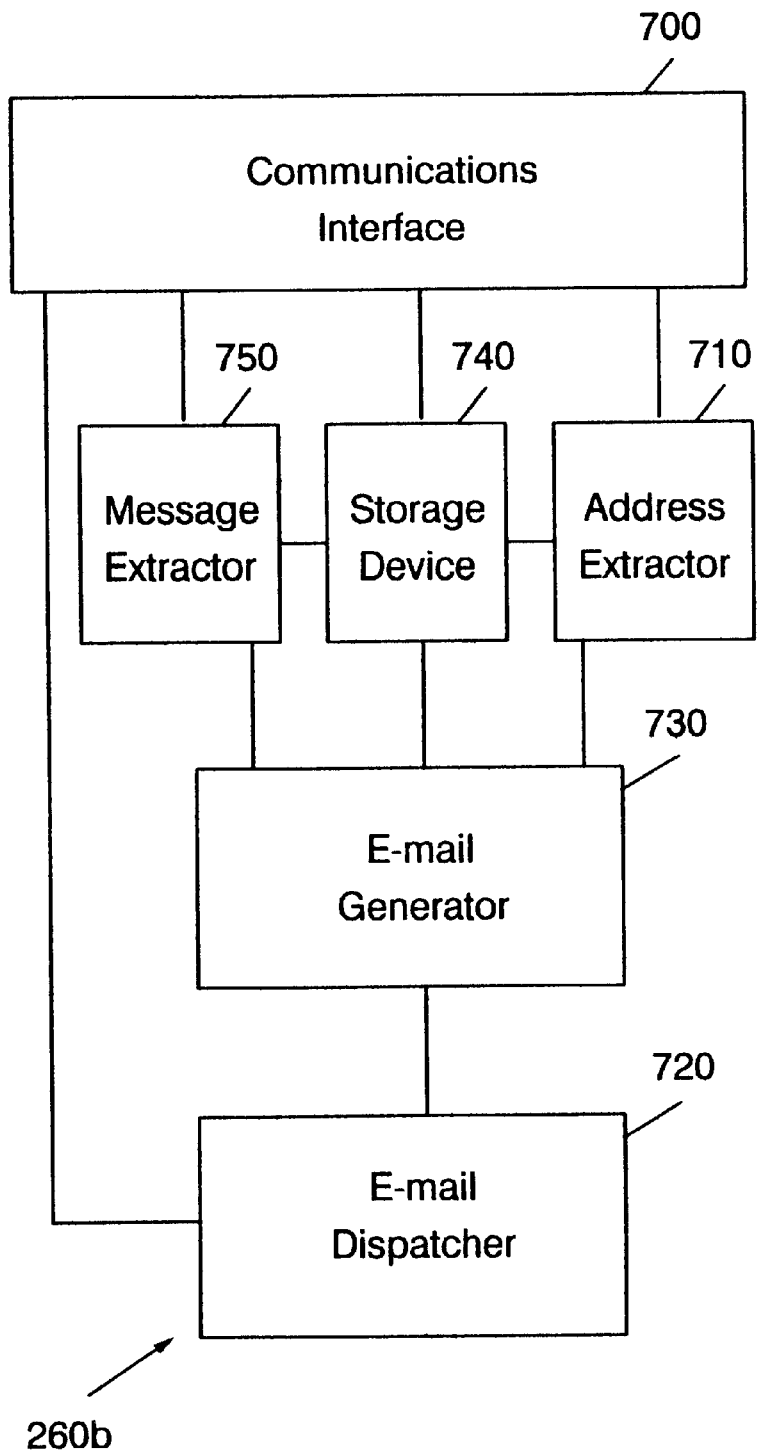
FIG. 5 is a block diagram of the Internet server for sending a message from the cellular telephone to one or more Internet stations.
Figure 6:
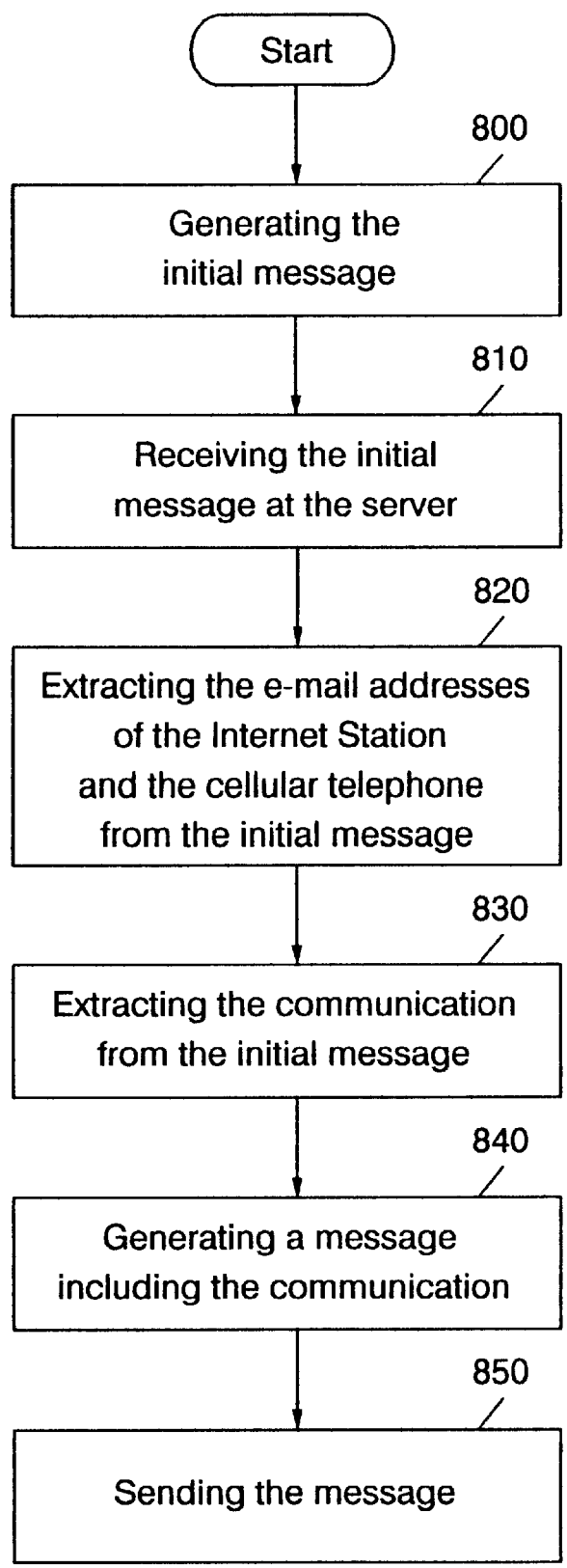
FIG. 6 is a flowchart illustrating operation of the Internet server of FIG. 5 for sending a message to one Internet station.
Figure 7:
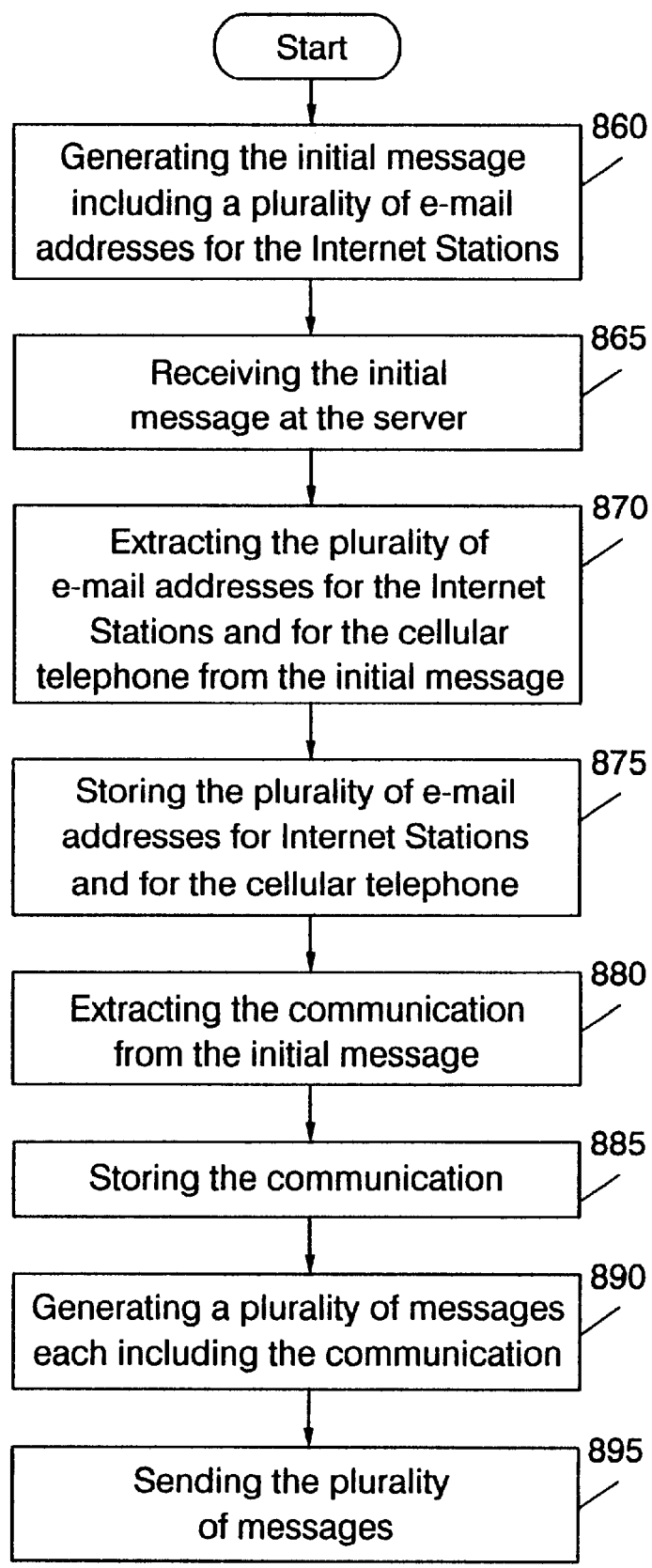
FIG. 7 is a flowchart illustrating operation of the Internet server of FIG. 5 for sending a message to multiple Internet stations.

An Internet server 260b for sending an initial message from the cellular telephone 210 to one or more Internet station, for example the Internet station 280, is shown in FIG. 5. Components of FIG. 5 which are counterparts of components of FIG. 3 are identified by reference numerals incremented by 400 and a detailed description will not be repeated. The Internet server 260b includes a message extractor 750 coupled to the communications interface 700 and the e-mail generator 730 for extracting the communication from a message received at the Internet server 260b. The Internet server 260b further includes a storage device 740 coupled to the communications interface 700, the message extractor 750, the address extractor 710 and the e-mail generator 730. Operation of the Internet server 260b in conjunction with the cellular communications system 200 is described with reference to the flow charts of FIGS. 6 and 7. FIG. 6 illustrates the operation of the Internet server 260b for sending a message to one Internet station. FIG. 7 illustrates operation of the Internet server 260b for sending a message to multiple Internet stations.

The initial message in the form of an SMS message 100 is generated by a user of the cellular telephone 210, at block 800 of FIG. 6. The user places an SMS address for the Internet server 260b in the recipient SMS address field 120 of the initial SMS message. An e-mail address of the Internet station is placed in a first line of the communication, where the SMS communication field 130 includes the communication the user wishes to send to the Internet station 280. The SMS address of the cellular telephone is automatically placed in the sender SMS address field 110 of the initial SMS message. The initial SMS message is sent by the cellular telephone 210, in the same way as the preliminary message is sent, described in block 410 of FIG. 4, and is received at the Internet server 260b, block 810.

The communications interface 700 receives the initial e-mail message and the address extractor 710 extracts the e-mail addresses of the Internet station 280 from the first line of the e-mail communication field 180, and extracts the e-mail address of the cellular telephone 210 from the sender e-mail address field 160, block 820. The message extractor 750 extracts the communication, beginning at the second line of the e-mail communication field 180, block 830. A message is generated by the e-mail generator 730, block 840. To generate the message, the e-mail generator 730 places the e-mail address of the Internet station in the recipient e-mail address field 170 of the message, and places the e-mail address for the cellular telephone 210 in the sender e-mail address field 160 of the message. The extracted communication is placed in the e-mail communication field 180 of the message. The message is passed to the e-mail dispatcher 720, which sends the message to the Internet station 280 using the communications interface 700 and the Internet 250, block 850, in the same manner as the reply message is sent in block 440 of FIG. 4.

The Internet server 260*b* thus allows the user of the cellular telephone to send a communication to the Internet station where the SMS address of the Internet station is not available to the user of the cellular telephone.

Operation of an alternate embodiment of the Internet server 260*b* is shown in the flow chart of FIG. 7. A user of the cellular telephone 210 generates the initial SMS message, block 860, as discussed in block 800 of FIG. 6 except the user places a plurality of e-mail addresses for Internet stations in the first line of the SMS communications field 130. The initial message is sent to and received by the Internet server 260*b*, block 865, in a similar manner as discussed in block 810. The address extractor 710 extracts the plurality of e-mail addresses for the Internet stations from the first line of the e-mail communication field 180, and extracts the e-mail address for the cellular telephone from the sender e-mail address field 160, block 870. Each of the plurality of e-mail addresses may be separated by a space or a comma. Each of the plurality of e-mail addresses are stored by the address extractor 710 in the storage device 740, block 875. The communication is extracted from the e-mail communications field 180 by the message extractor 750, block 880, in a similar manner as discussed in block 830. The communication is stored by the message extractor 750 in the storage device 740, block 885.

In block 890, the e-mail generator 730 generates a plurality of messages, one message for each of the plurality of Internet stations. The e-mail generator 730 accomplishes this by retrieving one of the plurality of e-mail addresses for Internet stations from the storage device 740, placing the retrieved e-mail address for the Internet station in the recipient e-mail address field 170, and retrieving the communication from the storage device 740 and placing the communication in the e-mail communications field 180 of the message. This process is repeated for each Internet station e-mail address, where the e-mail address for the cellular telephone 210 is placed in the sender e-mail address field 160 of each message by the e-mail generator 730. The messages are sent by the e-mail dispatcher 720, block 895, using the communications interface 700 and the Internet 250, and each message is delivered to its corresponding Internet station.

In a further alternate embodiment (not shown), the user of the cellular telephone 210 places a list name representing a plurality of e-mail addresses for Internet stations in the first line of the communication, where the list name is stored at the Internet server 260*b*. The address extractor 710 extracts the list name from the first line of the e-mail communications field 180 of the initial e-mail message, and the e-mail generator 730 determines the plurality of e-mail addresses for the Internet station using a recipient lookup table present in the storage device 740. The recipient lookup table includes a first column having a plurality of list names, and a second column having a plurality of e-mail addresses for Internet stations corresponding to each list name of the first column. A message is generated for each of the Internet stations in a similar manner as described with respect to block 890 of FIG. 7, and the e-mail dispatcher 720 sends each of the plurality of messages to the corresponding Internet stations.

Thus, having the Internet server 260*b* allows the user of the cellular telephone to send a communication to a plurality of Internet stations, thereby saving a significant amount of time as compared with sending the communication individually to each of the plurality of Internet stations.

Figure 8:
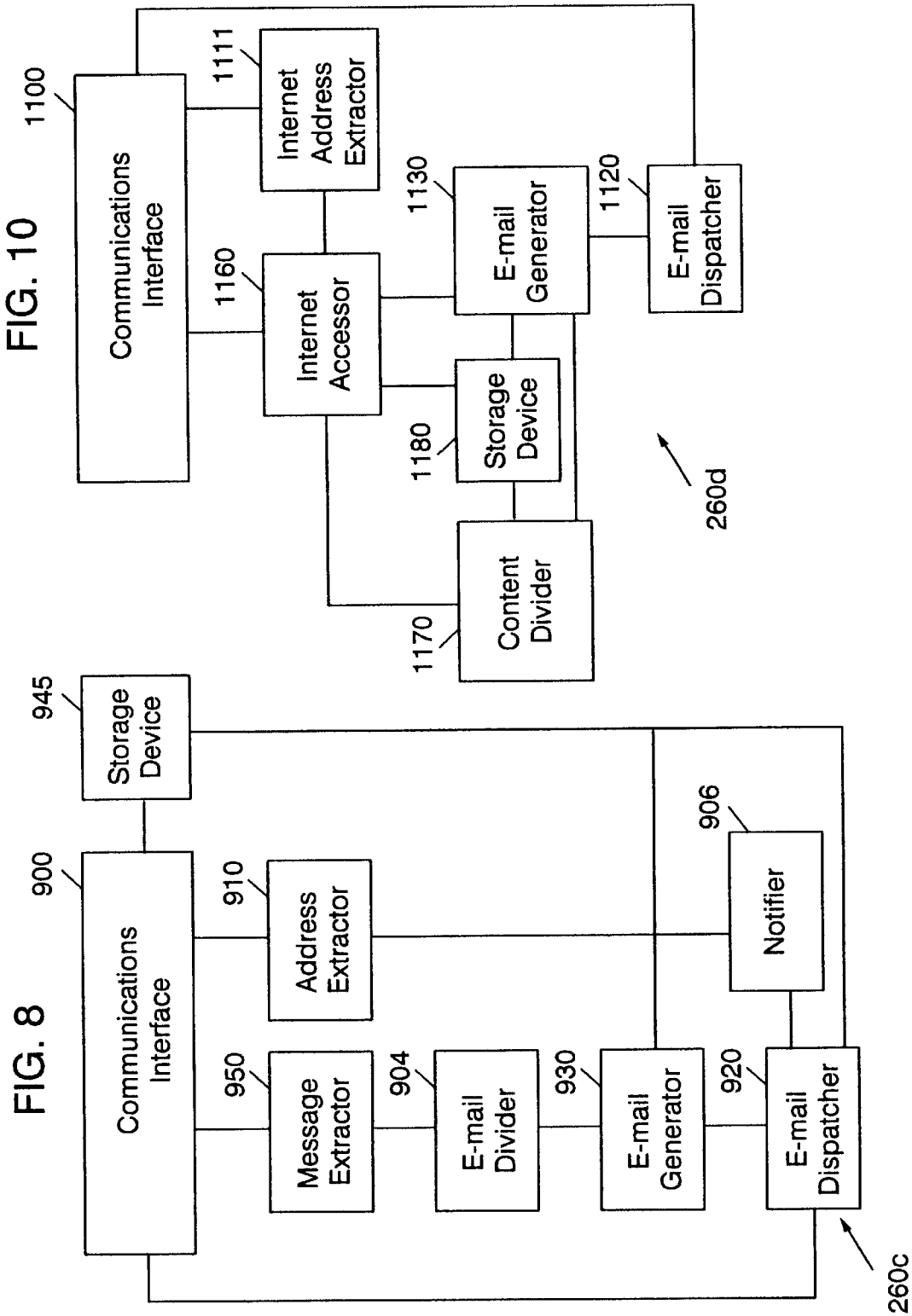
FIG. 8 is a block diagram of the Internet server for delivering messages greater than a maximum SMS message length.

An Internet server 260*c* for delivering messages greater than a maximum SMS message length is shown in the block diagram of FIG. 8. Components of FIG. 8 which are counterparts of components of FIG. 5 are identified with reference numerals incremented by 200 and a detailed description will not be repeated. The Internet server 260*c* includes the e-mail generator 930 for determining an e-mail address of the cellular telephone 210. The message extractor 950 is coupled to an e-mail divider 904. The e-mail divider 904 is further coupled to an e-mail generator 930, and divides a communication in the communications field of a message into a plurality of portions. A notifier 906, which is coupled to the address extractor 910, the e-mail generator 930 and the e-mail dispatcher 920, generates a notification message informing the cellular telephone 210 about the message. The Internet server 260*c* further includes a storage device 945 which is coupled to the communications interface 900, the e-mail dispatcher 920, and the e-mail generator 930. Operation of the Internet server 260*c* will be discussed in relation to the flow chart of FIG. 9.

An e-mail message is generated by the Internet station 280 in the form of the Internet e-mail message 150 which has a communication in the e-mail communications field 180 greater than the maximum 140 character message length permitted by the SMS e-mail utility. The e-mail message further includes a server e-mail address of the cellular telephone 210 in the recipient e-mail address field 170. The server e-mail address of the cellular telephone identifies the cellular telephone 210 at the server. The e-mail message is received by the communications interface 900 of the server 260*c*, block 1000. The e-mail message is passed to the address extractor 910 and the message extractor 950. The address extractor 910 extracts the server e-mail address of the cellular telephone from the recipient e-mail address field 170 of the email message, and the message extractor 950 extracts the communication from the e-mail communication field 180, block 1005. The e-mail generator 930 determines the e-mail address of the cellular telephone using a cellular telephone lookup table, block 1010. The cellular telephone lookup table has a first column with server e-mail addresses of cellular telephones and a second column with e-mail addresses of cellular telephones corresponding to the server e-mail addresses of the first column. The e-mail generator 930 searches the first column for the server e-mail address of the cellular telephone, and selects the corresponding e-mail address of the cellular telephone from the second column.

The e-mail divider 904 divides the communication into a plurality of portions, each portion being less than the maximum 140 character message length permitted by the e-mail utility, block 1020. The e-mail generator 930 generates a plurality of messages, block 1030, one message for each of the plurality of portions. The e-mail generator 930 places one of the plurality of portions into each message and places the e-mail address of the cellular telephone 210 in the recipient e-mail address field of each message. An e-mail address for the Internet station 280, retrieved from the sender e-mail address field of the e-mail message, is placed in the sender e-mail address field 160 of each message. The e-mail dispatcher 920 sends each of the messages to the cellular telephone, block 1040, using the communications interface 900 and the Internet 250.

The Internet server address of the cellular telephone may be created by the user of the cellular telephone telephoning his mobile service provider and requesting an Internet server address. An operator at the mobile service provider adds the server e-mail address for the cellular telephone to the first column of the cellular telephone lookup table with a corresponding Internet e-mail address in the second column. Alternatively, the Internet server address is created by the cellular telephone, where the cellular telephone sends a server e-mail address request message to the Internet server. The first line of the communication of the request message includes a desired server e-mail address for the cellular telephone. The Internet server places the desired server e-mail address in the first column of the cellular telephone lookup table, and the Internet e-mail address of the cellular telephone in a corresponding location in the second column of the cellular telephone lookup table. However, if the desired server e-mail address already exists, the Internet server generates a denial message which is sent to the cellular telephone informing the user of the cellular telephone that the desired server e-mail address is taken. The user of the cellular telephone may send another server e-mail address request message including a different desired server e-mail address. In another embodiment, the user of the cellular telephone receives an Internet server address using an Internet account, where the user logs onto an Internet address serving the Internet server and selects a server e-mail address. If the server e-mail address is already in use, the user is prompted to select another.

When dividing the communication into a plurality of portions, the e-mail divider 904 looks for a "space" to prevent fragmentation of a word between messages. Alternatively, the e-mail divider 904 may divide the portions based on the occurrence of a "period" at the end of a sentence to prevent fragmentation of sentences between messages.

In a further embodiment, the Internet server includes an Internet station exclusion list where the Internet server 260c does not forward messages from an Internet station in the Internet station exclusion list. In another embodiment, the Internet server includes a subject exclusion list, where the Internet server does not forward messages having subjects listed in the subject exclusion list. The Internet station exclusion list and the subject exclusion list may be created in a similar manner as discussed above regarding attaining a server address for a cellular telephone.

In an additional embodiment, the Internet server does not include in the messages lines from the communication which do not have spaces, as such lines may be binary attachments which are not meant for a communication to the cellular telephone.

In a further embodiment, the e-mail dispatcher 920 stores each of the messages including the portions of the communication in the storage device 945. The notifier 906 generates a notification message to inform the cellular telephone 210 about the received message, where the notification message includes the e-mail address of the cellular telephone in the recipient e-mail address field 170, the e-mail address of the Internet server 260c in the sender e-mail address field 160, and identifies the Internet station 280. The notification message may further include a subject of the message, where the subject is extracted from the subject field 190 of the message by the message extractor 950. The e-mail dispatcher 920 sends the notification message to the cellular telephone 210 using the communications interface 900 and the Internet 250. The e-mail generator 930 may include a counter for counting the messages, where the notification message indicates the number of messages to follow. After sending the notification message, the e-mail dispatcher 920 sends each of the stored messages to the cellular telephone 210.

In a further embodiment, the e-mail dispatcher 920 sends the messages only after an e-mail request message is received from the cellular telephone 210. The e-mail request message is generated by the cellular telephone 210 replying to the notification message.

In an additional embodiment, the Internet server limits the number of messages sent to the mobile cellular telephone, where the cellular telephone user must generate an additional e-mail request message before receiving additional messages.

In an additional embodiment, the Internet server stores the message in the storage device 945 until the user of the cellular telephone accesses the message using an Internet e-mail account.

Having the Internet server 260c allows the cellular telephone 210 to receive an e-mail message greater than the maximum 140 character limit imposed by the e-mail utility of the SMS 235 by breaking the e-mail message into a plurality of messages. Each message is less than the 140 character limit, thereby preventing truncation of the message by the Internet e-mail gateway.

An Internet server 260d for providing the cellular telephone 210 access to an Internet web page is shown in the block diagram of FIG. 10. Components of FIG. 10 which are counterparts of components of FIG. 3 are identified by reference numerals incremented by 800 and a detailed description will not be repeated. The Internet server 260d includes an Internet address extractor 1111 coupled to the communications interface 1100 and extracts Internet web page addresses. The Internet address extractor 1111 is further coupled to an Internet accessor 1160, for accessing the Internet web page address and receiving a content of the Internet web page. The Internet accessor 1160 is further coupled to the communications interface 1100, the e-mail generator 1130, a content divider 1170, and a storage device 1180. The content divider 1170 is further coupled to the e-mail generator 1130 and the storage device 1180, and divides the content of the Internet web page into a plurality of portions. The storage device 1180 is further coupled to the e-mail generator 1130 and stores the content of the Internet web page. Operation of the Internet server 260d is described with reference to the flow chart of FIG. 11.

A request message in the form of an SMS message 100 requesting access to the Internet web page 290 is generated by a user of the cellular telephone 210, block 1200. The user of the cellular station 210 places the SMS address for the Internet server 260d in the recipient SMS address field 120. An Internet web page address for an Internet web page, for example the Internet web page 290, is placed in the SMS communication field 130. The SMS address of the cellular telephone 210 is automatically placed in the sender SMS address field 110 of the request SMS message. The request SMS message is sent to the Internet server 260d, block 1210, in the same way the preliminary SMS message is sent to the Internet server, discussed in reference to block 410 of FIG. 4.

The communications interface 1100 passes the request e-mail message to the Internet address extractor 1111, where the Internet web page address is extracted from the e-mail communication field 180, block 1220. The Internet accessor 1160 uses the Internet web page address to access the Internet web page 290 using the communications interface 1100 and the Internet 250 block 1230. In block 1240, a content of the Internet web page 290 is received by the Internet accessor 1160. The e-mail generator 1130 generates a message, as shown in block 1250. The e-mail address for the cellular telephone 210 is retrieved from the sender e-mail address field 160 of the request e-mail message and placed in the recipient e-mail address field 170 of the message. The e-mail address of the Internet server 260d is placed in the sender e-mail address field 160 of the message. The content of the Internet web page is placed in the e-mail communications field 180 of the message, and the message is sent to the cellular telephone 210 by the e-mail dispatcher 1120 using the communications interface 1100 and the Internet 250, block 1260.

As the maximum length for the communication in the SMS message is 140 characters, the content of the Internet web page 290 is ideally less than 140 characters, as in an Internet web page designed specifically for cellular telephone users.

Figure 9:
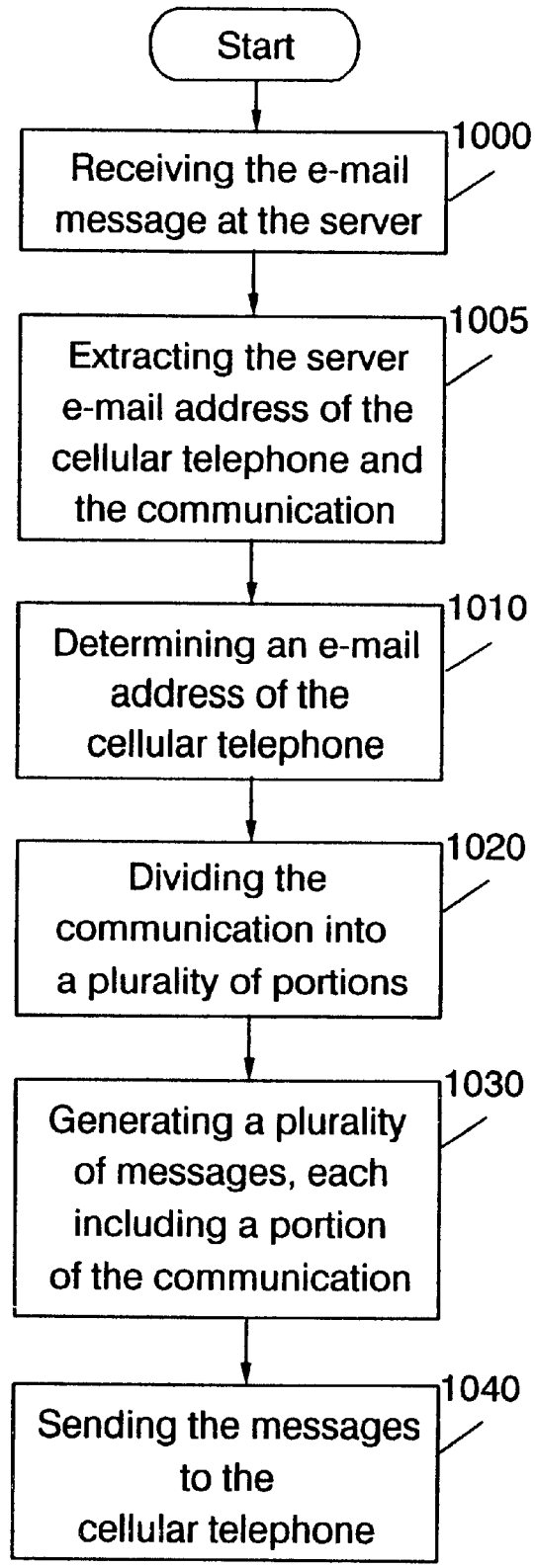
FIG. 9 is a flow chart illustrating operation of the Internet server of FIG. 8.

In a further embodiment, where the content of the Internet web page 290 is greater than the maximum 140 character limit of the SMS e-mail utility, the content divider 1170 divides the content into a plurality of portions in a similar manner as the communication is divided in block 1020 of FIG. 9. The e-mail generator 1130 generates a plurality of messages in a similar fashion of that discussed in block 1030 of FIG. 9. The messages are sent to the cellular telephone 210 by the e-mail dispatcher 1120 using the communications interface 1100 and the Internet 250.

Having the Internet server 260d is advantageous as it allows the user of the cellular telephone 210 access to Internet web pages, thereby providing the user with information such as sports scores, stock prices, weather forecasts and lottery numbers.

Although the Internet servers and methods are disclosed with respect to a GSM telecommunications system, one skilled in the art would realize they are usable with any telecommunications system having a messaging service feature similar to that in the GSM system, for example, the U.S. Digital Advanced Mobile Phone System and the Japanese Digital Cellular System. Additionally, the Internet server may be software running on a suitable personal computer, where the personal computer is connected to the Internet.

While particular embodiments of the invention have been described and illustrated, it should be understood that the invention is not limited thereto since modifications may be made by persons skilled in the art. The present application contemplates any and all modifications that fall within the spirit and scope of the underlying invention disclosed and claimed herein.

We claim:

1. A method of acquiring for a cellular telephone a messaging service address for an Internet station, using an Internet server and a cellular communications system including the cellular telephone and a messaging service e-mail utility, where the messaging service address for the Internet station is not available, the method comprising the steps of:

generating a preliminary message at the cellular telephone, the preliminary message having a messaging service address of the server in a recipient address field and including an e-mail address of the Internet station;

sending the preliminary message to the server;

extracting the e-mail address of the Internet station from the preliminary message at the server;

generating a reply message to the cellular telephone at the server, the reply message having the e-mail address of the Internet station in a sender address field; and sending the reply message from the server to the cellular telephone.

2. The method of claim 1 wherein the step of generating the preliminary message includes placing only the e-mail address of the Internet station in the preliminary message.

3. The method of claim 1 wherein the step of sending the preliminary message further includes the steps of:

receiving the preliminary message at a mobile service provider;

forwarding the preliminary message from the mobile service provider to an Internet e-mail gateway; and forwarding the preliminary message from the Internet e-mail gateway to the server.

4. The method of claim 1 wherein the step of sending the reply message further comprises the steps of:

receiving the reply message at an Internet e-mail gateway;

determining the messaging service address of the Internet station at the Internet e-mail gateway;

placing the messaging service address of the Internet station into the sender address field of the reply message at the Internet e-mail gateway;

forwarding the reply message to a mobile service provider; and delivering the reply message from the mobile service provider to the cellular telephone.

5. The method of claim 4 wherein the Internet gateway includes a messaging service lookup table having a first column of e-mail addresses and a second column of corresponding messaging service addresses, and the step of determining the messaging service address includes:

searching the first column for the e-mail address of the Internet station, and if the e-mail address of the Internet station is located in the first column, placing the corresponding messaging system address from the second column in the sender address field of the reply message, and if the e-mail address of the Internet station is not located, adding the e-mail address of the Internet station to the first column, generating the messaging service address for the e-mail address of the Internet station, and placing the generated messaging service address in the second column at a location corresponding to the e-mail address of the Internet station in the first column and in the sender address field of the reply message.

6. The method of claim 1 wherein the step of generating the preliminary message includes placing a plurality of e-mail addresses for Internet stations into the preliminary message, the step of extracting the e-mail address further includes the step of extracting each of the e-mail addresses for Internet stations from the preliminary message, the step of generating the reply message includes generating reply messages for each of the e-mail addresses for Internet stations, each reply message having a corresponding e-mail address for the Internet station in the sender address field, and the step of sending the reply message further includes the step of sending each reply messages to the cellular telephone.

7. An Internet server for use with a cellular communications system including a cellular telephone and a messaging service e-mail utility, for acquiring for the cellular telephone a messaging service address of an Internet station, where the messaging service address for the Internet station is not available, the cellular telephone generating a preliminary message having a messaging service address of the server in a recipient address field and including an e-mail address of the Internet station, the Internet server comprising:
- a communications interface for receiving the preliminary message;
- an address extractor coupled to the communications interface for extracting the e-mail address of the Internet station from the preliminary message;
- an e-mail generator coupled to the address extractor for generating a reply message having the e-mail address of the Internet station in a sender address field and an e-mail address for the cellular telephone in the recipient address field; and
- an e-mail dispatcher coupled to the e-mail generator and the communications interface for sending the reply message to the cellular telephone.

8. A method of accessing an Internet web page having an Internet web page address from a cellular telephone, using an Internet server and a communications system including the cellular telephone and a messaging service e-mail utility, the method comprising the steps of:
- generating a request message at the cellular telephone, the request message including a messaging service address of the server in a recipient address field and the Internet web page address;
- sending the request message to the server;
- extracting the Internet web page address from the request message at the server;
- accessing the Internet web page at the server using the Internet web page address;
- receiving a content of the Internet web page at the server;
- determining an e-mail address of the cellular telephone at the server;
- generating a message at the server, the message including the e-mail address of the cellular telephone in the recipient address field and the content of the Internet web page; and
- sending the message to the cellular telephone.

9. The method of claim 8 wherein the content of the Internet web page is greater than a maximum allowable message length for the e-mail utility, and
- the step of generating the message includes dividing the content of the Internet web page into a plurality of portions, each portion being less than the maximum allowable message length, and generating a plurality of messages, each including one of the portions of the content and having the e-mail address of the cellular telephone in the recipient address field, and
- the step of sending the message includes sending the plurality of messages to the cellular telephone.

10. The method of claim 9 wherein the step of sending the plurality of messages includes sending a first message in response to the request message, and waiting for an additional request message from the cellular telephone before sending an additional message to the cellular telephone.

11. The method of claim 8 further comprising the step of storing the message in a storage device.

12. An Internet server for use with a communication system including a cellular telephone and a messaging service e-mail utility, for providing the cellular telephone access to an Internet web page having an Internet web page address, the cellular telephone sending a request message to the server including the Internet web page address, the server comprising:
- a communications interface for receiving the request message and accessing the Internet web page;
- an address extractor coupled to the communications interface for extracting the Internet web page address from the request message;
- an Internet accessor coupled to the address extractor and the communications interface for accessing the Internet web page address and receiving a content of the Internet web page;
- an e-mail generator coupled to the Internet accessor for generating a message, the message including an e-mail address of the cellular telephone and the content of the Internet web page; and
- an e-mail dispatcher coupled to the e-mail generator and the communications interface for sending the message to the cellular telephone.

13. The server of claim 12 wherein the content of the Internet web page is greater than a maximum allowable message length and further comprising a divider coupled to the Internet accessor and the e-mail generator for dividing the content into a plurality of portions, each of the portions being less than the maximum allowable message length, and wherein
- the e-mail generator generates a plurality of messages, each of the messages including the e-mail address of the cellular telephone and one of the portions of the content, and
- the e-mail dispatcher sends at least one of the plurality of messages to the cellular telephone.

14. The server of claim 12 further comprising a storage device coupled to the Internet accessor for storing the content of the Internet web page.

15. The server of claim 12 further comprising a storage device coupled to the e-mail generator for storing the message.

16. A method for processing and delivering an e-mail message from an Internet Station to a cellular telephone using an Internet server and a communication system including the cellular telephone and a messaging service e-mail utility, the e-mail message being greater than a maximum allowable message length for the e-mail utility, the method comprising:
- receiving the e-mail message from the Internet Station at the server, the e-mail message having a server e-mail address of the cellular telephone in a recipient address field and a communication;
- determining an e-mail address of the cellular telephone at the server;
- dividing the communication into a plurality of portions at the server, each portion being less than the maximum allowable message length;
- generating a plurality of messages, each message having the e-mail address of the cellular telephone in the recipient address field and including one of the portions of the communication; and
- sending the messages to the cellular telephone,
  - wherein the server includes a cellular telephone lookup table having a first column including an server e-mail addresses and a second column including e-mail addresses of cellular telephones corresponding to the server e-mail addresses of the first column, wherein the step of determining the e-mail address of the cellular telephone includes searching the first column for the server e-mail address of the cellular telephone and selecting the corresponding e-mail address of the cellular telephone from the second column when the server e-mail address of the cellular telephone is located.

* * * * *